Figures 1, 2:
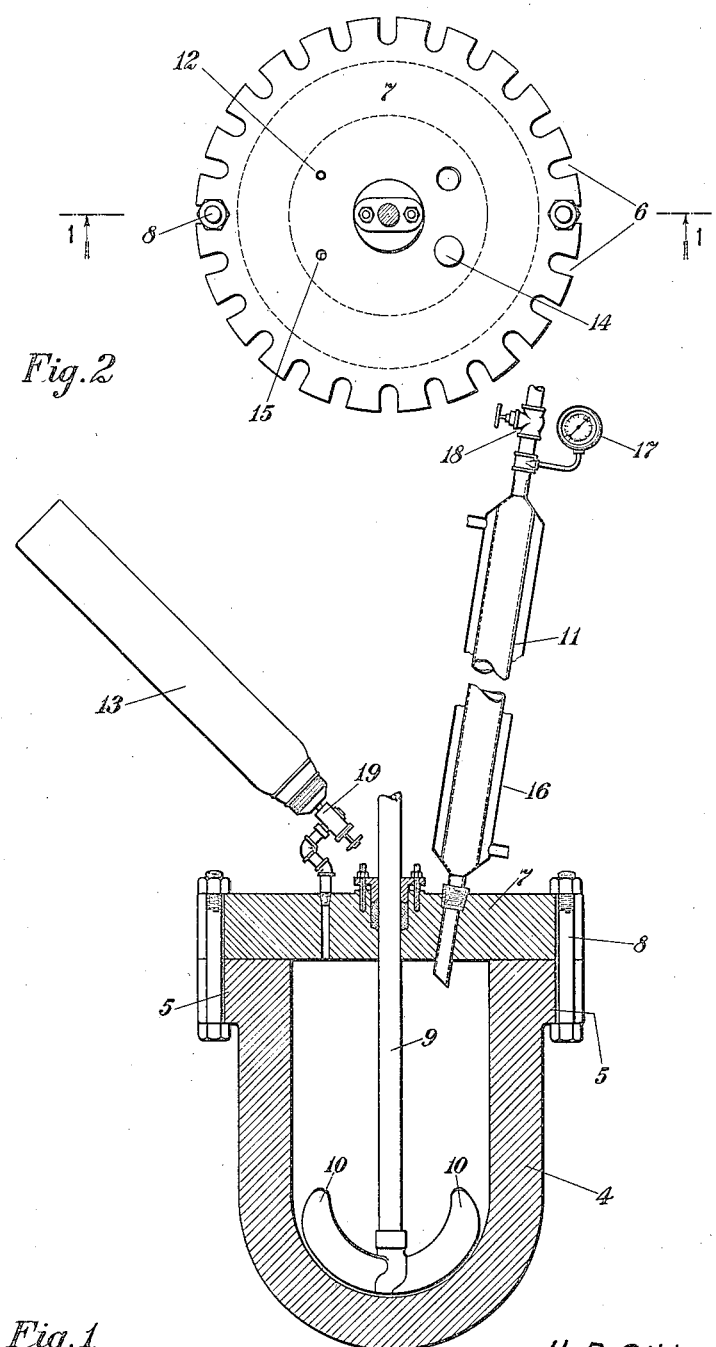

H. D. GIBBS.
PROCESS OF MAKING ALUMINUM CHLORIDE.
APPLICATION FILED MAY 19, 1921.

1,422,560.

Patented July 11, 1922.

H. D. Gibbs, Inventor

By his attorney J. R. Squair

UNITED STATES PATENT OFFICE.

HARRY D. GIBBS, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF MAKING ALUMINUM CHLORIDE.

1,422,560.  Specification of Letters Patent.  Patented July 11, 1922.

Application filed May 19, 1921. Serial No. 470,841.

*To all whom it may concern:*

Be it known that I, HARRY D. GIBBS, a citizen of the United States, and a resident of Penns Grove, in the county of Salem and State of New Jersey, have invented a certain new and useful Process of Making Aluminum Chloride, of which the following is a specification.

This invention relates to the manufacture of aluminum chloride and comprises a process of producing this substance by effecting a reaction between aluminum and liquid chlorine.

Heretofore, aluminum chloride has been manufactured in several different ways, the most important of which are: (1) by causing chlorine gas to react with metallic aluminum at high temperatures; and (2) by bringing about an interaction between bauxite or alumina, carbon, and chlorine gas.

The first of these old processes possesses the disadvantages that the temperatures required are very high, and the excessive action of the chemicals upon the apparatus requires frequent and expensive replacements. Moreover, the aluminium melts and thus presents only a small surface to the action of the chlorine gas thus slowing the speed of the reaction. The aluminium chloride distils out of the apparatus and is condensed, a rather difficult and troublesome operation.

The second of the above mentioned old processes presents many of the same disadvantages enumerated above, in that excessive action of the reagents necessitates frequent and expensive replacements.

I have discovered that aluminum will combine with chlorine at relatively low temperatures, and that the reaction may be most advantageously effected by bringing the aluminum into contact with liquid chlorine. I have found that the reaction between these two elements takes place rapidly at the boiling point of chlorine at atmospheric pressure; namely, approximately —33°. With elevated temperatures, the reaction is more rapid. At the elevated temperatures, it is necessary to form the reaction in a closed vessel, thus taking advantage of the increased pressure of the chlorine to raise the boiling point of the liquid chlorine and thus keep it in the liquid state. The reaction between iron or steel and liquid chlorine does not take place until the temperatures become very high and therefore it is possible to manufacture aluminium chloride in an iron vessel of the nature of an autoclave wherein the pressure may rise to many atmospheres consistent with the strength of the iron or steel vessel.

I have also discovered that aluminium chloride is soluble in liquid chlorine, probably with the production of a heretofore undescribed compound consisting of aluminium chloride in combination with chlorine. This solution of aluminum chloride in liquid chlorine constitutes a new intermediate product.

My new process may be illustrated by the following example: Metallic aluminum in the form of sheets or scrap is placed in a vessel which may be made gas-tight, and an excess of liquid chlorine is then introduced. The reaction, which is exothermic, begins at once and continues rapidly until all the aluminum has combined with chlorine to form $AlCl_3$. Shortly after the reaction has started, the heat generated brings the liquid chlorine to the boiling point. The chlorine vapors formed may be allowed to pass into a reflux condenser cooled by chilled brine or other cooling medium. In some cases it is desirable to cool the vessel in which the reaction is taking place. The mixture of aluminum and chlorine should preferably be stirred as the reaction proceeds. If sufficient cooling is provided for, it is not necessary that the pressure in the apparatus rise above five atmospheres; however, it is no disadvantage to allow the pressure and the temperature to rise to higher limits consistent with the strength of the apparatus. If the reaction proceeds in too violent a manner, the liquid chlorine may be introduced in smaller quantities or the cooling may be increased.

Upon completion of the reaction the unchanged chlorine is distilled off and can be condensed and used again with new batches of aluminum. There is left aluminium chloride in a dry state in the form of a more or less granular powder in the most active form that this compound can be used for the various organic condensations or for the cracking of petroleum or other uses.

The new process may be carried out in various forms of apparatus, one form being illustrated in the accompanying drawings, in which Figure 1 shows a vertical section through the center of the autoclave, and Figure 2 shows a plan view of the cover of the autoclave.

The apparatus comprises an autoclave 4 having around its upper edge an outwardly extending flange 5 provided at regular intervals with recesses adapted to register with corresponding recesses 6 in the edge of the autoclave cover 7, the recesses being designed to receive bolts 8 for holding the cover in place.

The cover 7 has a hole through the center through which extends a shaft 9 carrying stirring arms 10. The end of a reflux condenser 11 extends through the cover, the latter being also provided with a hole 12 for the introduction of chlorine from a supply tank 13, and with a filling hole 14 through which the aluminum may be introduced. A thermometer well is indicated at 15.

The condenser is provided with a jacket 16 for the reception of chilled brine or cold water. The upper end of the condenser is in communication with a pressure gauge 17. A needle valve 18 is located beyond the pressure gauge connection. The supply of chlorine may be regulated by a valve 19.

The operation in this apparatus is as follows:

The required quantity of aluminium is placed in the autoclave 4, through the filling hole 14; this hole is then closed and the liquid chlorine in excess is run in from the chlorine cylinder 13, by opening the valve 19. The heat of the reaction causes the chlorine to boil and the vapors are condensed in the condenser 11 which is cooled preferably by chilled brine circulating in the jacket 16, and the condensed vapors are returned to the autoclave in the form of liquid. If the pressure becomes too great, as shown by the gauge 17, it may be released by opening the valve 18. The autoclave 4 may also be cooled by surrounding it with chilled brine and the contents may be agitated by rotating the stirring shaft 9.

On completion of the reaction, the chlorine may be distilled out of the autoclave, and the dry aluminium chloride removed; or the aluminium chloride may be used in the autoclave 4 by adding other chemicals suitable for the production of various reactions with aluminium chloride.

Although I prefer to operate in such a way that the aluminum will react with liquid chlorine at the latter's boiling point, in order to get the benefit of the maximum temperature consonant with maintaining the chlorine in the liquid condition and under a safe pressure, I may under certain circumstances operate at a temperature substantially below the boiling point of the liquid chlorine at any given pressure. Cooling the reaction mass to a temperature below the boiling point of liquid chlorine is sometimes desirable for the purpose of moderating the reaction in case it becomes too violent.

I claim:—

1. The process of producing aluminum chloride which comprises bringing aluminum into contact with liquid chlorine.

2. The process of producing aluminum chloride which comprises subjecting aluminum to the action of liquid chlorine at about the boiling point of the latter.

3. The process of producing aluminum chloride which comprises subjecting aluminum to the action of liquid chlorine at at pressure substantially above atmospheric pressure.

4. The process of producing aluminum chloride which comprises subjecting aluminum to the action of liquid chlorine at about its boiling point and under a pressue substantially above atmospheric pressure.

5. The process of producing aluminum chloride which comprises subjecting aluminum to the action of liquid chlorine at about its boiling point and under a pressure of about 5 atmospheres above atmospheric pressure.

6. The process of producing aluminum chloride which comprises subjecting aluminum to the action of liquid chlorine, the amount of liquid chlorine present being in excess of that theoretically required, allowing the reaction to proceed until substantially all the aluminum has been converted into aluminum chloride, and then distilling off the excess chlorine.

7. The process of producing aluminum chloride which comprises subjecting aluminum to the action of chlorine at a temperature below 0° C.

8. The process of producing aluminum chloride which comprises immersing aluminum in liquid chlorine, allowing the liquid to boil and the vapors to pass into a reflux condenser, and maintaining the absolute pressure below 10 atmospheres.

9. As a new composition of matter a solution of aluminum chloride in liquid chlorine.

10. As a new composition of matter a solution of 1 part aluminum chloride in 1½ parts liquid chlorine.

In testimony whereof I affix my signature.

HARRY D. GIBBS.